United States Patent [19]

Bauer

[11] Patent Number: 4,716,586
[45] Date of Patent: Dec. 29, 1987

[54] STATE SEQUENCE DEPENDENT READ ONLY MEMORY

[75] Inventor: Jerry R. Bauer, San Jose, Calif.

[73] Assignee: American Microsystems, Inc., Santa Clara, Calif.

[21] Appl. No.: 920,935

[22] Filed: Oct. 17, 1986

Related U.S. Application Data

[63] Continuation of Ser. No. 559,155, Dec. 7, 1983, abandoned.

[51] Int. Cl.$^4$ .............................................. H04L 9/00
[52] U.S. Cl. ........................................ 380/3; 364/200; 380/23; 380/25
[58] Field of Search ............... 178/22.01, 22.19; 364/200 MS File; 380/3, 4, 23, 25

[56] References Cited

U.S. PATENT DOCUMENTS

| | | | |
|---|---|---|---|
| 4,120,030 | 10/1978 | Johnstone | 178/22.19 |
| 4,306,289 | 12/1981 | Lumley | 364/200 |
| 4,377,844 | 3/1983 | Kaufman | 364/200 |
| 4,433,211 | 2/1984 | McCalmont et al. | 178/22.04 |
| 4,471,163 | 9/1984 | Donald et al. | 364/200 |
| 4,519,036 | 5/1985 | Green | 364/200 |
| 4,525,599 | 6/1985 | Curran et al. | 364/200 |
| 4,573,119 | 2/1986 | Westheimer et al. | 380/4 |

Primary Examiner—Gary V. Harkcom
Assistant Examiner—C. H. Lynt
Attorney, Agent, or Firm—Alan H. MacPherson; Richard Franklin; Paul J. Winters

[57] ABSTRACT

The addresses of firmward (ROM) being interrogated to ascertain data are continuously monitored. Selected key addresses are recognized by address detection means. Timing means is then actuated to count a preset number of address accesses, system clock cycles, or other suitable timing means. A substitute address is provided to the firmware when the timer counts down. If the incoming address is in the correct sequence then the substituted address will be the same as the incoming address and correct data will be provided by the ROM. Otherwise, incorrect data will be provided. Alternately, after countdown the incoming address can be compared with the expected incoming address. If the comparison indicates identity then the incoming address can be supplied to the firmware. Otherwise, an incorrect substitute address can be provided to the input of the firmware or incorrect substitute data can be provided on the output of the firmware. In all versions correct data will only be provided if the firmware is interrogated in the correct address sequence.

7 Claims, 6 Drawing Figures

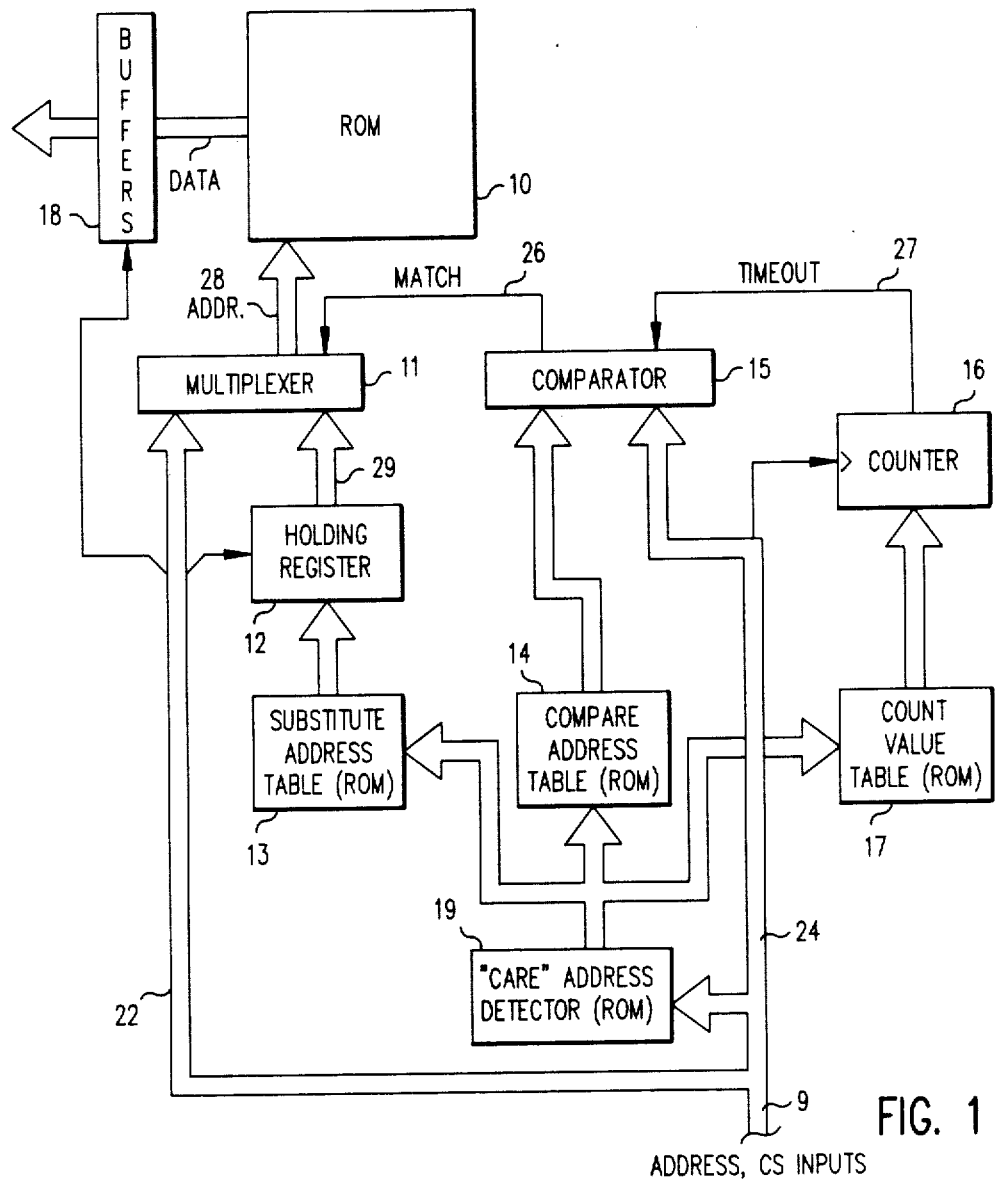
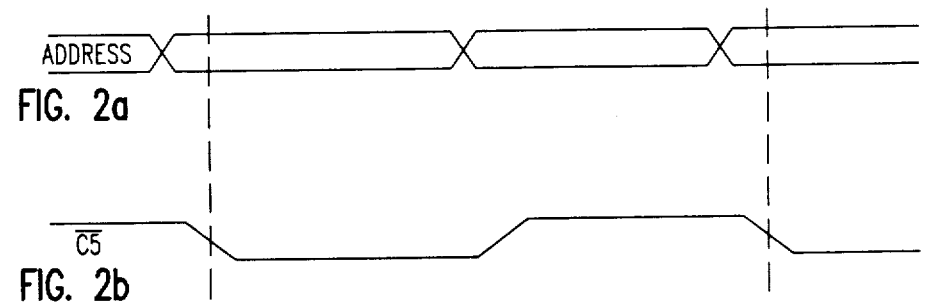
FIG. 1
FIG. 2a
FIG. 2b

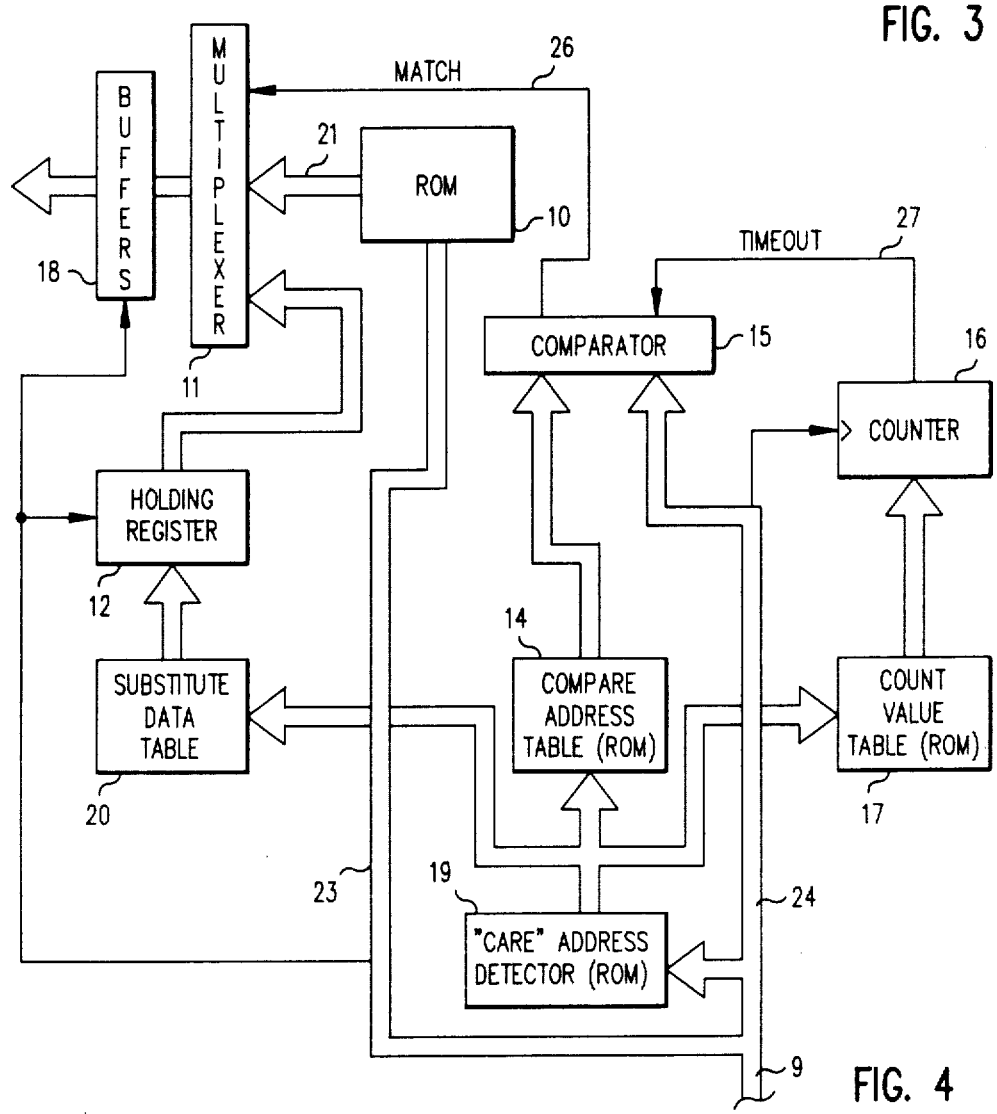

STATE SEQUENCE DEPENDENT READ ONLY MEMORY

This application is a continuation of application Ser. No. 06/559,155, filed Dec. 7, 1983, now abandoned.

BACKGROUND OF THE INVENTION

1. Field of the Invention

This invention relates to an apparatus and method for protecting software and, more particularly, relates to an apparatus and method for protecting programs or data placed in firmware such as a Read Only Memory (ROM) whereby the program or data is only available externally if it is accessed in a specific address sequence.

2. Description of the Prior Art

Software piracy flourishes. The unauthorized copying of computer tapes, floppy discs and other forms of software constitutes a threat to the integrity of computer manufacturers and distributors and to software houses. Copying has also occurred where algorithms or initializing data have been incorporated in firmware. Typically, the quantity of data placed in firmware is not great but it is often extremely crucial to the operation, for example, of video games. For factory programmed read-only memories (ROMs) or for field programmed read-only memories (PROMs) the program data may reveal crucial information about the operation of a system. One approach to protecting the data is to provide a fusible link on the array so that the data, once programmed, simply cannot be externally accessed. See, e.g., R. Birkner, et al, U.S. Pat. No. 4,124,899, "Programmable Read-Only Memory", and which is hereby incorporated by reference. This approach has the disadvantage that, once the fuse is opened, the PROM may not be altered and the use of diagnostic routines is inhibited.

Copy protection schemes fall into four broad categories: hardware dependent approaches, load format alteration, software that checks the environment as it executes, and software that executes through a "filter". In each case the protection schemes involve an interaction of software and hardware. Where software is used, a microprocesssor is necessarily involved so that one convenient technique of copying is to intercept the instructions and data supplied to the microprocessor. The various approaches that have been used to protect software are discussed in J. Commander, et al, "How Safe is Your Software", Microcomputing, July 1982, p. 60, which is hereby incorporated by reference.

Most commercially available microprocessors have been designed with the intent to obtain small die size and high speed operation. No on-board circuitry has been included to prevent software copying so as not to increase die size or reduce operating speed. If hardware-dependent software protection were added to microprocessors, then a master/slave relationship could be established between system software and application software. In the slave mode memory subunits could be partitioned into islands. Control could then be prevented from passing from one memory partition to another. If a program attempted to address memory locations outside its partition, an error message would be generated and the program attempting illegal access could be erased from memory. This approach is a sophisticated solution but would require special design of the integrated circuits. As far as simple firmware such as read-only memories are concerned, therefore, it is highly desirable to provide apparatus which will simply and reliably provide protection against copying.

It is therefore an object of the present invention to provide circuitry for use with firmware such as read only memories which requires the addresses to be accessed in a specified sequence in order for the access to be allowed.

It is a further object of the present invention to provide a means for address detection along with a cycle detection, sequencer to examine one or more sets of address inputs to determine the order in which addresses are accessed and to compare them with a predefined, correct sequence.

It is another object of the present invention to provide a method for detecting the sequence in which addresses of firmware are interrogated, comparing the sequence with the predefined correct sequence to determine and signify whether access is authorized.

SUMMARY

The addresses of firmware (ROM) being interrogated to ascertain data are continously monitored. Selected key addresses are recognized by address detection means. Timing means is then actuated to count a preset number of address accesses, system clock cycles, or other timing means. A substitute address is provided to the firmware when the timer counts down. If the incoming address is in the correct sequence then the substituted address will Q be the same as the incoming address and correct data will be provided by the ROM. Otherwise, incorrect data will be provided. Alternately, after countdown the incoming address can be compared with the expected incoming address. If the comparison indicates identity then the incoming address can be supplied to the firmware. Otherwise, an incorrect substitute address can be provided to the input of the firmware, incorrect substitute data can be provided on the output of the firmware, or further operation of the memory can be prevented. In all versions correct data will only be provided if the firmware is interrogated in the correct address sequence.

BRIEF DESCRIPTION OF THE DRAWINGS

For a more complete understanding of the apparatus and method of the present invention reference may be had to the accompanying drawings which are incorporated herein by reference and in which:

FIG. 1 is a block diagram of one embodiment of the present invention illustrating the use of a substitute address table;

FIGS. 2a and 2b are timing diagrams, respectively, for one embodiment of the address and chip select signals used in conjunction with the structures of FIGS. 1 and 5;

FIG. 3 is a listing showing the operation of a specific segment of the address detection circuitry of one embodiment of the present invention;

FIG. 4 is a block diagram of another embodiment of the present invention illustrating the use of a substitute data table.

DETAILED DESCRIPTION

Figure 5:
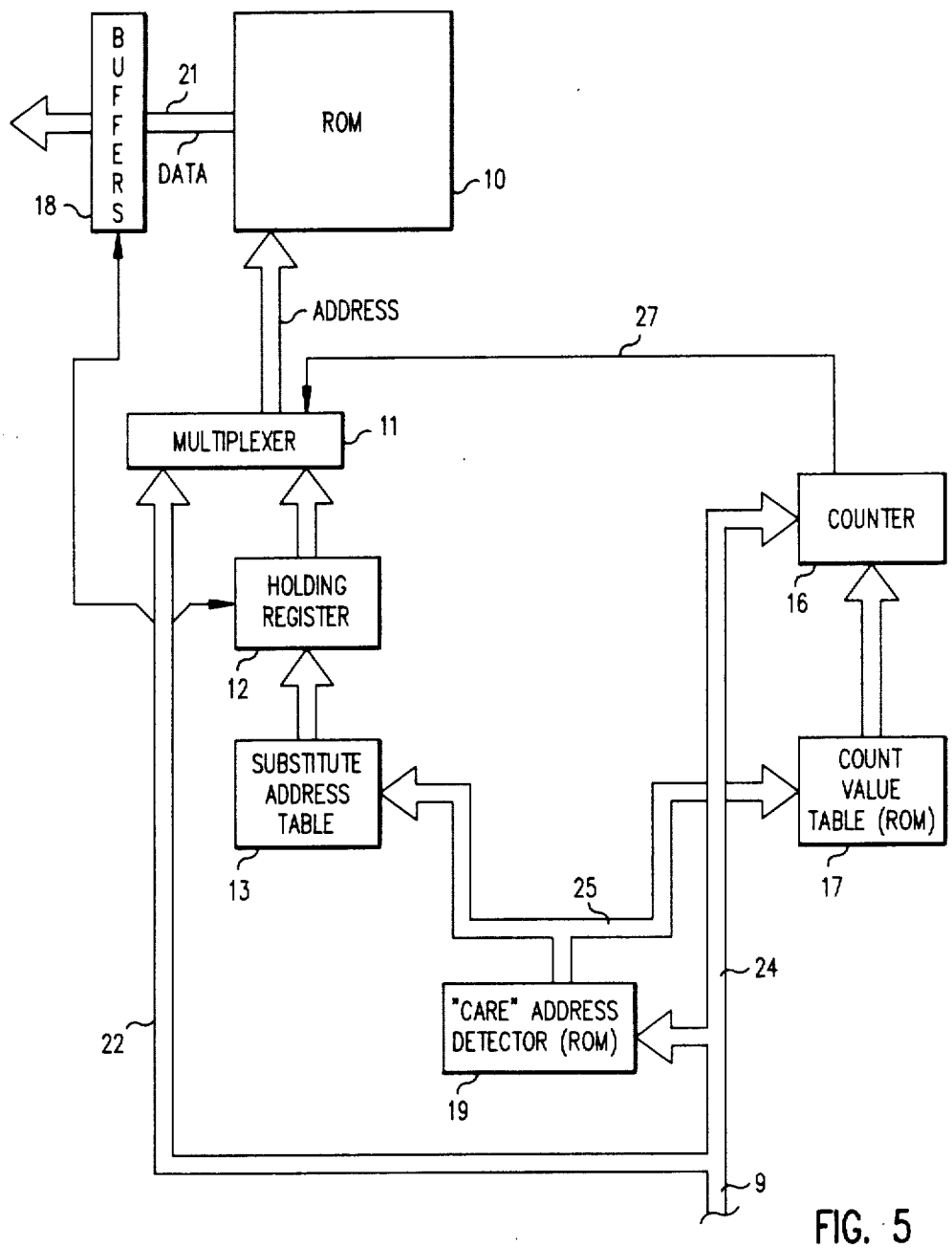
FIG. 5 is a block diagram of a generalized embodiment of the present invention.

In a generalized data processing system a central processor such as a microprocessor will execute program instructions which it fetches along with data from memory. Whether the data is stored in software or firmware, e.g. in read only memories, it is important that the data be secure. Typically, the accessing of data in read only memories does not require that the data be interrogated in an address specific sequence. The state sequence dependent read only memory of the present invention provides protection for the data by requiring that the data be accessed in particular sequence in order for the correct data to be retrieved. Knowledge of the correct sequence of addresses would only be in the hands of an authorized party.

A general embodiment of the state sequence dependent read only memory of this present invention is shown in FIG. 5. Execution of program steps is carried out in a processor (not shown). The processor generates addresses which are carried to the ROM network on incoming bus 9. Also supplied on incoming bus 9 is a chip select (CS) signal which is used as a state counter. This is shown in FIG. 2a-2b, where the addresses are strobed on the falling edge of the chip select signal. The incoming addresses are supplied on branch bus 22 to multiplexer 11. Most address instructions pass through multiplexer 11 directly to ROM 10 to access the specified address. To confirm the correctness of the address sequence, the addresses will continuously be checked and compared with a stored list of key addresses. When a key address is detected a sequence dependent routine is initiated; this is described in detail subsequently. For a 16k ROM (1K=1024 binary digits or "bits") it has been found sufficient to check approximately 100 key addresses spread throughout the memory array. Such key addresses can be selected to be critical points in the program. Once ROM 10 is interrogated, data is supplied on output data bus 21 to output buffers 18 and thence back to the processor where the data is used as program instructions or data in the execution of the program. The data received by the processor will be that supplied directly by the ROM 10 from incoming addresses or from substituted addresses. If the incoming addresses are in a correct sequence the substituted data will be the correct data; if not, then erroneous data will be substituted.

The incoming addresses on bus 9 are also supplied on branch bus 24 to the Care Address Detector 19, a read only memory, and to the counter 16. When a key address is detected in Care Address Detector 19 the counter 16 is loaded with a count from count value table 17 defining the number of addresses after which the incoming address will be checked. The counter 16 then begins to count down to zero. When the count is completed (i.e., the counter counts down to zero), an address is substituted by substitute address table 13. Substitute address table 13 substitutes an alternative address for the correct address according to the prearranged sequence to holding register 12 which then supplies the information to multiplexer 11 which places the substituted address in the address stream which is being directed to ROM 10 to access stored data. If the sequence of the addresses in the address stream is out of order because the entity interrogating the ROM is not an authorized one and does not know the correct sequence for the addresses, then the substituted "correct" address will in fact seem to be an incorrect one and incorrect data will be provided to the interrogating entity. Only if the correct sequence is followed will the substituted "correct" address retrieve data which is correct and will benefit the interrogating entity. This process is repeated for every key address which is detected by Care Address Detector 19. Holding register 12 may be positioned between substitute address table 13 and multiplexer 11 or may be placed between Care Address Detector 19 and substitute address table 13. Holding register 12 functions to hold the substituted address (or the instruction to fetch a substituted address if holding register is placed between Care Address Detector 19 and substitute address table 13) until the counter 16 counts down to zero from the count value provided by substitute address table 17.

A variation (not shown) of the general embodiment of FIG. 5 provides for the substitution of correct data to the output of the ROM 10. Here, no address comparison is made, but a substitute data table 20 contains the correct data for the addresses expected in accordance with the prearranged authorized sequence. When the key address is detected by Care Address Detector 19, a count value is loaded into counter 16 and when countdown has been completed, the correct data is provided on the output of ROM 10 no matter what instantaneous address is then appearing in the address stream. This correct data will be in fact incorrect insofar as the interrogating party is concerned when the improper address sequence is used because it will not be data for the specific address the interrogating party has addressed out of the predefined sequence. The interrogating party will thus obtain a false map of data in the ROM 10.

Alternate embodiments providing enhanced flexibility are shown in FIGS. 1 and 4. Whereas in the embodiment of FIG. 5 the correct information (i.e., the correct information stored in a location which, in normal operation, is accessed a selected number of steps after the accessing of a key address) is supplied when the counter 16 reaches zero, in the embodiments of FIGS. 1 and 4 the correct information is substituted only if upon comparison the input address at that time continues to be the correct one. If the input address is incorrect at that time then the substitution is either of incorrect data (FIG. 4) or of an incorrect address (FIG. 1). With respect to FIG. 4, the input addresses are supplied on incoming bus 9 through branch bus 23 directly to ROM 10. ROM 10 provides as an output signal the data contained at each interrogated address in the manner well known in the art. This data is supplied on data bus 21 to multiplexer 11 which is here positioned in the data stream rather than in the address stream as in FIGS. 1 and 5. The data output from ROM 10 is transmitted to the external processor (not shown) through buffers 18. This output data is multiplexed by multiplexer 11 with substitute data supplied through holding register 12 from substitute data table 20. The logic which controls the selection between output data from bus 21 and substitute data from holding register 12 is provided by the output signal from comparator 15 via the match line 26. The output of comparator 15 as supplied on match line 26 is determined as follows. Incoming addresses are supplied on bus 9 through branch bus 24 simultaneously to Care Address Detector 19 and comparator 15. When a key address is detected by Care Address Detector 19 an output signal is supplied to both compare address table 14 and count value table 17. Upon receipt of a signal signifying a key address, count value table 17 loads a count in counter 16 which then starts to count down to zero. When counter 16 reaches zero, a signal is provided to comparator 15 on timeout line 27. When timeout occurs a comparison is made by comparator 15 between the address known to be correct from the predefined sequence and contained in Compare Address Table 14 and the address which is provided on incoming bus 9 and branch bus 24. Compare address table 14 contains the sequential listing of those addresses in the sequence which are associated with key addresses, i.e., are to be found in the correct address sequence some number (as specified by count value table 17), of addresses after a key address is detected If the instantaneous address on branch bus 24 is identical to address supplied by compare address table 14, then a match is signified on match line 26 and multiplexer 11 transfers the data, known now to be properly accessed, from ROM 10 via data bus 21, to the processor through buffers 18. Thus, the output of the compare address table 14 indirectly signifies whether a certain address, a key address plus a number of intervening addresses as specified by Count Value Table 17, is in fact in proper sequence On the other hand, if the comparator 15 senses that the instantaneous address provided on bus 9 and branch bus 24 is other than that supplied by compare address table 14 when the timeout signal on line 27 is received, then the signal on match line 26 indicates that multiplexer 11 should accept the substitute data from holding register 12 as supplied by substitute data table 20. This data will have been placed in table 20 when a key address was detected on Care Address Detector 19. Holding register 12, as with other embodiments, may be placed as shown between substitute data table 20 and multiplexer 11 or may be placed between Care Adress Detector 19 and substitute data table 20. In the latter case it will not hold substitute data but rather will hold the instruction to fetch substitute data. To the external processor which receives data through output buffers 18 it will appear that data is received for each address. The substitution, however, will provide incorrect data which will evetually provide erroneous results in the performance of program steps by the processor. The substitution of erroneous data by buffers 18 is subtle and may remain undetected, to the detriment of the unauthorized copier.

An embodiment analogous to the embodiment of FIG. 4 is shown in FIG. 1. Here, a substitute address is supplied rather than substitute data. Incoming addresses are supplied by the external processor on data bus 9. These addresses are carried on branch bus 22 to multiplexer 11. For most addresses there is a transfer through multiplexer 11 to address bus 28 and thence to ROM 10. For a select number of addresses, i.e. the key addresses or care addresses detected by Care Addresses Detector 19 plus a specified interval of addresses—an interval which may be zero—the normal address stream on branch bus 22 will be blocked and a multiplexing of the substituted addresses provided on bus 29 from holding register 12 as supplied by substitute address table 13. Whether there will be a substitution will depend upon a comparison of the instantaneous address with the correct address known from the predefined address sequence. Once a key address is detected by Care Address Detector 19 an input signal is supplied to Count Value Table 17, to Substitute Address Table 13 and to Compare Address Table 14. Within the Count Value Table 17 is the known number of counts between particular key addresses and the addresses stored in Compare Address Table 14 according to the predefined address sequence. Thus, this number, the interval between the key address and the comparison address in table 13, is loaded in counter 16 which begins to count down to zero. When the counter 16 reaches zero a signal is provided on timeout line 27 to comparator 15. At this time the instantaneous address supplied on input bus 9 and branch bus 24 should be that of the comparison address supplied by Compare Address Table 14 if the corrct address is received on input bus 9. If the two addresses are identical then a match is signified on match line 26 to multiplexer 11. Upon signification of a match the incoming address from branch bus 22 is allowed to pass through multiplexer 11 and is introduced on bus 28 to interrogate ROM 10. The correct data is then supplied on data bus 21 to buffers 18 and thence to the external processor. On the other hand, if the incoming address on branch bus 24 when timeout is signified on line 27 is not that of the address as supplied by Compare Address Table 14 then the signal on match line 26 does not signify identity. Then a substitute address is supplied by substitute address table 13 and holding register 12 and is passed through multiplexer 11. Holding register 12 may be positioned downstream of substitute address table 13 (i.e., between substitute address table 13 and multiplexer 11) or upstream of substitute address table 13 (i.e., between care address detector 19 and substitute address table 13). The function of holding register 12 is either to hold the substitute address (if positioned downstream) or the request to fetch a substitute address from substitute address table 13 (if positioned upstream) until timeout is signified on line 27 without a valid comparison in comparator 15.

In the embodiments of FIGS. 1 and 4 contents of Care Address Detector 19, Count Value Table 17 and Compare Address Table 14 will be interrelated so that they are consistent with the correct predefined address sequence. Thus, for every key address (Care Address Detector 19) and every specified count downstream in time from the key address (Count Value Table 17) there will be an associated address which correctly fits into the unique address sequence (Compare Address Table 14). When this associated address is identical to the instantaneous address, as stated above, a match is indicated on line 26.

In order to make a read only memory secure it is not necessary to monitor all addresses. For a 16k (1k=1024 bits) ROM it would be highly satisfactory to look at about 100 addresses. Preferrably, the addresses will be spread throughout the addresses in the array. The implementation of the circuitry of the present invention on an integrated circuit chip for the case of 100 addresses out of those available in a 16k ROM requires an addition of about 10 to 25 percent additional die area. The smallest number of addresses may be used for the case where the addresses are selected at strategic positions in the program stream or data arrangement, e.g. where program flow changes or where it is known that critical data is stored.

In reading addresses it is generally necessary to strobe the address stream by means of a clock synchronized with the address stream. In the various embodiments discussed previously available chip clocks are typically used in conjunction with the address stream. As shown in the vertical dotted lines bridging FIGS. 2a and 2b the address stream is strobed on the falling edge of the chip select, an internal clock available on almost all microprocessor chips. Thus, the available chip select clock (CS), shown in FIG. 2b, is effectively used as a state counter. Alternately, a separate pin could be added to Q the chip and an external clock could be provided which would determine the state of the address.

The operation of the state sequence dependent read only memory may be seen with reference to the partial program listing of FIG. 3. Here, the interrogation of a ROM by an 9900 microprocessor, such as is manufactured by American Microsystems, Inc., the assignee of this invention, is shown. The codes are those used with this microprocessor and are well known in the microprocessor art. The partial sequence is shown for a circuit where the data is substituted, of the type shown in FIG. 4. The columns show, respectively, the Address Input, the Code associated with the Address Input, the correct ROM data associated with that address input, the Circuit Function of the state sequence dependent ROM, the Dumped Code and the Substituted Data. The address LABEL is a trigger address, one of the key addresses recognized by the Care Address Detector 19. Upon receipt of the key address a count is entered into the counter 16 by means of Count Value Table 17. In one embodiment of this invention, this count is equal to the number of system clock cycles required to reach that part of the program indicated by the "JMP" instruction, with counter 16 being controlled by the same system clock. This count, in the example shown in FIG. 3, is equal to the sum of the clock cycles required to first make the jump to the address g input "output" line of the program, then to reach the return code "RTWP", and then to actually make the return to the program line storing the code "JMP". Alternatively, the count stored in counter 16 is equal to the number of ROM address accesses required to reach the designated line of program (i.e., in this example the "JMP" code) and the counter 16 is controlled by each ROM address access, rather than by the system clock. If the input address does not match the compare address from compare address Table 14 when timeout occurs, substitute data is supplied by substitute data table 20 to holding register 12. Alternatively, other counts may be used in a similar manner.

The state sequence dependent read only memory of the present invention is suitable for use as a read only memory which may not readily be copied. Copying is only allowed if the attempt to copy occurs in a specified sequence The state sequence dependent read only memory may also be used as a watchdog timer for processors. Here, the read only memory is used to monitor the execution of programs in the processor. Unless the processor is executing a particular address when the counter times out then the processor may be reset. Or, if correct data is not present at a time when it is known to be expected than a reset routine may be inititated. Thus, in general the detection of correct program execution is equivalent to the detection of an incorrect address. Both are contemplated by the state sequence detection read only memory of the present invention.

The specific embodiments of this invention described in this specification are intended to serve by way of example and are not a limitation on the scope of my invention. Numerous other embodiments of this invention will become apparent to those of ordinary skill in the art in light of the teachings of this specification.

I claim:

1. A state sequence dependent memory device comprising:
   an input transfer path;
   an output transfer path;
   means for providing data which receives instantaneous addresses from said input transfer path and provides data on said output trasnfer path;
   a key address detector which receives said instantaneous addresses from said input transfer path and detects when said instantaneous addresses are equal to certain key addresses, and in response to detection of any one of said key addresses provides an output signal:
   timing means which receives said instantaneous addresses from said input transfer path and said output signal from said key address detector, is enabled by said output signal from said key address detector to count said instantaneous addresses and upon reaching a predefined count provides a timing signal to said means for providing data; and
   means for supplying incorrect data to be sent on said output transfer path if said instantaneous address does not match a stored address when said timing signal is received by said means for providing data, connected to said key address detector and to said means for providing data.

2. A state sequence dependent memory device as in claim 1 wherein said means for supplying incorrect data is a substitute address table, and said means for providing data comprises:
   a multiplexer which receives said instantaneous addresses from said input transfer path, a substituted address from said substitute address table, and said timing signal from said timing means, said multiplexer selecting said substitute address when said timing signal is provided by said timing means and selecting said instantaneous address when said timing signal is not provided by aid timing means;
   a memory device which recevies said addresses selected by said multiplexer and in response thereto provides data on said output transfer path.

3. A state sequence dependent memroy device as in claim 2 in which said timing means comprises:
   a count value table which receives said output signal from said key address detector and in response provides said predefined count; and
   a counter which receives said predefined count from said count value table and said instantaneous addresses from said input transfer path, in response to said predefined count begins to count said instantaneous addresses, and upon completion of said predefined count provides said timing signal to said multiplexer.

4. A state sequence dependent memory device as in claim 2 in which said timing means comprises:
   a count value table which receives said output signal from said key address detector and in rsponse provides said predefined count;
   a counter which receives said predefined count from said count value table and said instantaneous addresses from said input transfer path, in response to said predefined count begins to count said instanteous addresses, and upon completion of said predefined count provides a timeout signal;
   a compare address table which receives said output signal from said key address detector and in response provides said stored address; and
   a comparator which receives said instantaneous addresses, said stored address, and said timeout signal, and upon receipt of said timeout signal if said stored address does not match said instantaneous address sends said timing signal to asid multiplexer.

5. A state sequence depenet memory device as in claim 1 wherein said means for suplying incorrect data comprises a substitute data table and said means for providing data comprises:

a memory device which receives said instantaneous address signals from said input transfer path and in response provides memory data; and a multiplexer which recevies said memory data, substitute data from said substitute data table, and sends data on said output transfer path, said multiplexer selecting said substitute data when said timing signal is provided by said timing means, and selecting said memory data when said timing signal is not provided by said timing means.

6. A state sequence dependent memory device as in claim 5 in which said timing means comprises:

a count value table which receives said output signal from said key address detector and in response provides said predefined count; and a counter which receives said predefined count from said count value table and said instantaneous addresses from said input transfer path, in response to said predefined count begins to count said instantaneous addresses, and upon completion of said predefined count provides said timing signal to said multiplexer.

7. A state sequence dependent memory device as in claim 5 in which said timing means comprises:

a count value table which receives said output signal from asid key address detector and in response provides said predefined count;

a counter which receives said predefined count from said count value table and said instantaneous addresses from said input trasnfer path, in response to said predefined count begins to count said instantaneous addresses, and upon completion of said predefined count provides a timeout signal;

a compare address table which receives said output signal from said key address detector and in response provides said stored address; and a comparator which receives said instantaneous addresses and said stored address, and upon receipt of said timeout signal if said stored address does not match said instantaneous address sends said timing signal to said multiplexer.

* * * * *